(12) United States Patent
Perrin et al.

(10) Patent No.: US 11,661,840 B2
(45) Date of Patent: May 30, 2023

(54) MULTI-FINGER CALIPER

(71) Applicant: Schlumberger Technology Corporation, Sugar Land, TX (US)

(72) Inventors: Cédric Perrin, Clamart (FR); Jose Luis Lopes, Clamart (FR); Miguel Delgado, Clamart (FR); Florian Becker, Clamart (FR); Pedro Alexandre Das Neves, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 344 days.

(21) Appl. No.: 17/247,271

(22) Filed: Dec. 7, 2020

(65) Prior Publication Data

US 2021/0180444 A1 Jun. 17, 2021

(30) Foreign Application Priority Data

Dec. 12, 2019 (EP) .................................... 19306640

(51) Int. Cl.
*G01B 7/13* (2006.01)
*E21B 47/08* (2012.01)

(52) U.S. Cl.
CPC ................ *E21B 47/08* (2013.01); *G01B 7/13* (2013.01)

(58) Field of Classification Search
CPC ............ E21B 47/08; G01B 7/13; G01B 21/14
See application file for complete search history.

(56) References Cited

U.S. PATENT DOCUMENTS

| 2,719,363 | A |   | 10/1955 | Franklin |
| 2,908,085 | A | * | 10/1959 | Price ....................... E21B 47/08 33/544.3 |
| 4,192,380 | A |   | 3/1980 | Smith |
| 4,559,709 | A |   | 12/1985 | Beseme et al. |
| 4,673,890 | A | * | 6/1987 | Copland ............... E21B 33/124 33/544.2 |

(Continued)

FOREIGN PATENT DOCUMENTS

| CN | 2139626 Y | 8/1993 |
| CN | 102102510 A | 6/2011 |

(Continued)

OTHER PUBLICATIONS

Brochure: Gyrodata, http://www.gyrodata.com/services/logging-services/multi-finger-caliper-logging/—downloaded on Dec. 1, 2020 (4 pages).

(Continued)

*Primary Examiner* — Yaritza Guadalupe-McCall

(57) ABSTRACT

The present disclosure introduces an MFC module for use in a tubular extending into a subterranean formation. The MFC module includes a tool body having slots that each include a receptacle. The MFC module also includes measuring fingers each independently rotatable within a corresponding one of the slots via a corresponding pivot formed by complementary linking portions of the measuring finger and the receptacle of the corresponding slot. The linking portions of the receptacle are situated on opposing side walls of the receptacle. The MFC modules also includes linear displacement sensors each operable for sensing an orientation of a corresponding one of the measuring fingers relative to the tool body.

19 Claims, 5 Drawing Sheets

(56) References Cited

U.S. PATENT DOCUMENTS

| | | | |
|---|---|---|---|
| 5,299,359 | A | 4/1994 | Estes et al. |
| 5,565,624 | A | 10/1996 | Deboaisne et al. |
| 5,947,213 | A | 9/1999 | Angle et al. |
| 6,112,809 | A | 9/2000 | Angle |
| 6,560,889 | B1 * | 5/2003 | Lechen .................. E21B 47/08 |
| | | | 33/558.2 |
| 7,272,504 | B2 | 9/2007 | Akimov et al. |
| 7,884,951 | B2 | 2/2011 | Prouvost et al. |
| 8,024,868 | B2 | 9/2011 | Brannigan et al. |
| 8,484,858 | B2 | 7/2013 | Brannigan et al. |
| 8,849,059 | B2 | 9/2014 | Scherteler et al. |
| 8,925,213 | B2 * | 1/2015 | Sallwasser ............. E21B 47/08 |
| | | | 33/544.2 |
| 9,803,468 | B2 * | 10/2017 | Sallwasser ............. E21B 47/08 |
| 10,605,582 | B2 * | 3/2020 | Ohmer .................... G01B 5/12 |
| 10,954,780 | B2 | 3/2021 | Ge et al. |
| 2008/0149348 | A1 | 6/2008 | DiFoggio et al. |
| 2008/0266577 | A1 | 10/2008 | Prouvost et al. |
| 2010/0319991 | A1 | 12/2010 | Brannigan et al. |
| 2012/0055711 | A1 | 3/2012 | Brannigan et al. |
| 2012/0239345 | A1 * | 9/2012 | Fraser .................... E21B 47/08 |
| | | | 702/157 |
| 2014/0354855 | A1 | 12/2014 | Venkataraman et al. |
| 2015/0285607 | A1 | 10/2015 | Helmore |
| 2016/0290047 | A1 | 10/2016 | Foucher et al. |
| 2017/0321540 | A1 | 11/2017 | Lu et al. |
| 2017/0322332 | A1 | 11/2017 | Cooper et al. |
| 2018/0196005 | A1 * | 7/2018 | Fanini .................... G01N 29/07 |
| 2021/0180442 | A1 * | 6/2021 | Perrin .................... E21B 47/08 |
| 2021/0180444 | A1 * | 6/2021 | Perrin .................... E21B 47/08 |
| 2022/0316318 | A1 * | 10/2022 | Almulhim ............... E21B 47/06 |

FOREIGN PATENT DOCUMENTS

| | | |
|---|---|---|
| CN | 204532342 U | 8/2015 |
| EP | 1640561 A1 | 3/2006 |
| EP | 2652678 B1 | 10/2013 |
| GB | 2291973 A | 2/1996 |
| WO | 2013082057 A1 | 6/2013 |
| WO | 2016115012 A1 | 7/2016 |
| WO | 2016178939 A1 | 11/2016 |
| WO | 2016201583 A1 | 12/2016 |

OTHER PUBLICATIONS

Govell: Multi-Finger Caliper (MFC) https://static1.squarespace.com/static/5c5146db4eddecf7a88e4a5d/t/5faa2af93511d8442bae0831/1604987705666/WellIntegrity_MFC%2Bcombined-+new.pdf—downloaded on Dec. 1, 2020 (6 pages).

Gelman A. et al., Borehole Image Correspondence and Automated Alignment, ICASSP 2017, New Orleans, USA, Mar. 5-9, 2017 (5 pages).

Partial European Search Report issued in EP Application 19306641.2, dated Nov. 13, 2020 (9 pages).

Extended European Search Report issued in EP Application 19306640.4 dated Nov. 13, 2020, 10 pages.

Exam Report issued in EP Application 19306641.2 dated Dec. 1, 2022, 5 pages.

Extended Search Report issued in European Patent Application No. 22163388.6 dated Nov. 9, 2022, 7 pages.

Office Action issued in U.S. Appl. No. 17/247,268 dated May 16, 2022, 23 pages.

* cited by examiner

MULTI-FINGER CALIPER

CROSS-REFERENCE TO RELATED APPLICATIONS

The present application claims priority to, and the benefit of the earlier filing date of, EP Patent Application No. 19306640.4, titled "Multi Finger Caliper," filed Dec. 12, 2019, the entirety of which is hereby incorporated herein by reference.

BACKGROUND OF THE DISCLOSURE

Assessment of oil/gas well corrosion during the production phase of a well is a complex problem of identifying and characterizing casing corrosion and other defects of various forms caused by many factors.

For example, such assessment may not adequately characterize small localized faults (e.g., ditches and holes) in the casing, may not accurately estimate the operating envelope of the well (e.g., based on the topology of faults and their grouping), and may not adequately identify and quantify reductions in the residual thickness of the casing wall. Moreover, existing assessment means may not be operable in some conditions encountered in the well during the production phase (e.g., gas, live production fluids, clear liquids).

Some existing tools for characterizing casing corrosion may include multi-finger caliper (MFC) tools. Such MFC tools determine variations in the inner diameter (ID) of the casing, which can be utilized in identifying corroded zones of the casing. An example of such MFC tools is described in the U.S. Pat. No. 5,299,359. However, the maintenance of such MFC tool and other existing MFC tools is complicated, and their measurement accuracy can evolve with time.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an MFC module for use in a tubular extending into a subterranean formation. The MFC module includes a tool body having slots that each include a receptacle. The MFC module also includes measuring fingers each independently rotatable within a corresponding one of the slots via a corresponding pivot formed by complementary linking portions of the measuring finger and the receptacle of the corresponding slot. The linking portions of the receptacle are situated on opposing side walls of the receptacle. The MFC modules also includes linear displacement sensors each operable for sensing an orientation of a corresponding one of the measuring fingers relative to the tool body.

The present disclosure also introduces a method including configuring measuring fingers in a tool body of an MFC module for use in a tubular extending into a subterranean formation. The tool body includes slots each including a receptacle. When assembled in the tool body, each measuring finger is independently rotatable within a corresponding one of the slots via a corresponding pivot formed by complementary linking portions of the measuring finger and the receptacle of the corresponding slot. For each measuring finger and corresponding slot, a first one of the linking portions of the measuring finger and the receptacle is a protruding portion, a second one of the linking portions of the measuring finger and the receptacle is a recessed portion, and an elasticity of at least one of the protruding and recessed portions permits engagement and disengagement of the protruding and recessed portions via application of a force sufficient to overcome the elasticity. Configuring the measuring fingers includes assembling an unassembled measuring finger into the tool body via application of the force to the unassembled measuring finger to cause engagement of the protruding and recessed portions of the unassembled measuring finger and a corresponding receptacle, and/or disassembling an assembled measuring finger from the tool body via application of the force to the assembled measuring finger to cause disengagement of the protruding and recessed portions of the assembled measuring finger and a corresponding receptacle.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
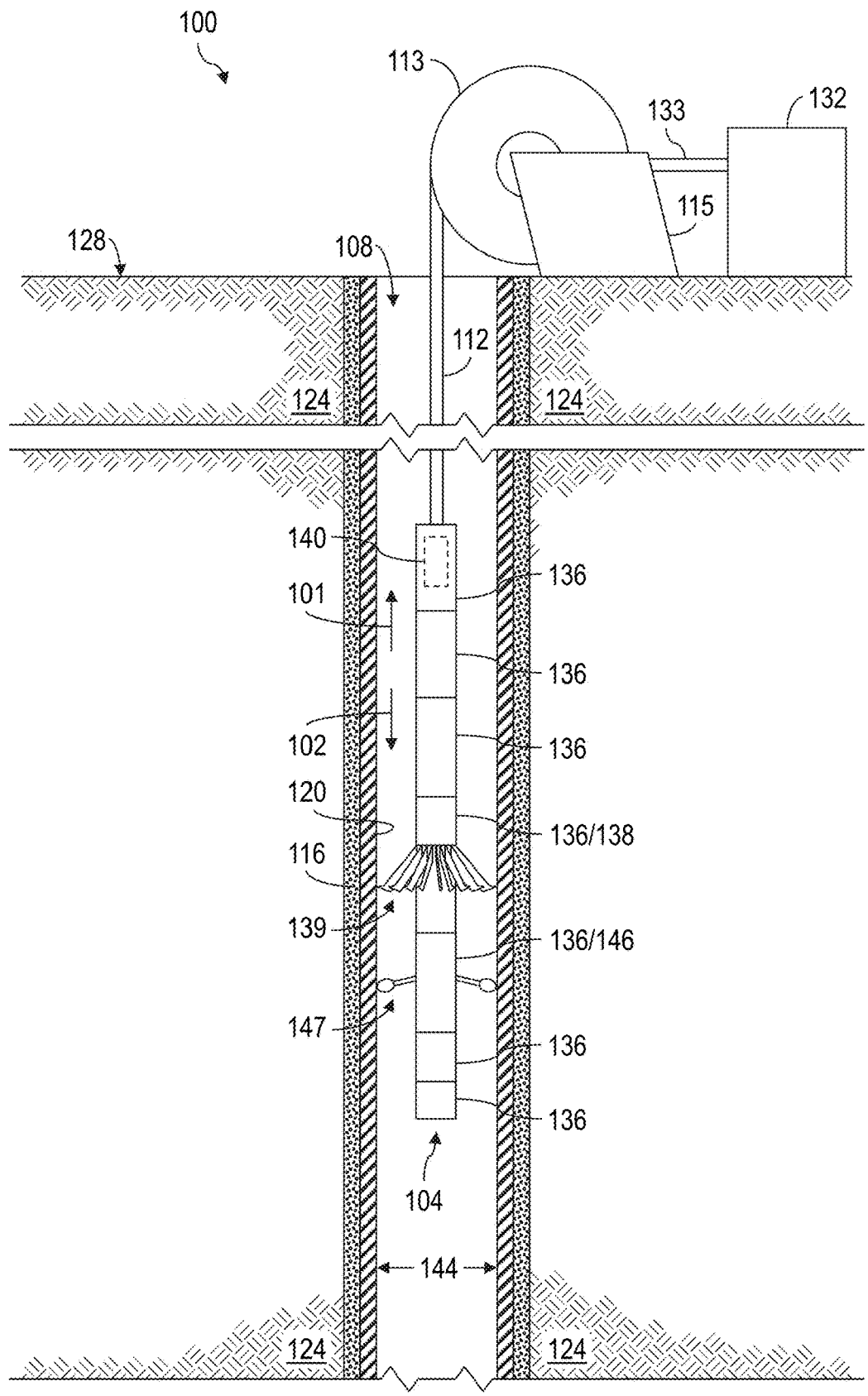
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity and does not in itself dictate a relationship between the various embodiments and/or configurations discussed. Moreover, the description of a first feature in contact with a second feature in the description that follows may include implementations in which the first and second features are in direct contact, and may also include implementations in which additional features may interpose the first and second features, such that the first and second features may not be in direct contact.

FIG. 1 is a schematic view of at least a portion of an example implementation of a wellsite system 100 to which one or more aspects of the present disclosure may be applicable. The wellsite system 100 may be onshore (as depicted) or offshore. In the example wellsite system 100 shown in FIG. 1, a toolstring 104 is conveyed in a borehole 108 via a wireline, slickline, and/or other conveyance means 112. The example wellsite system 100 may be utilized for evaluation of the borehole 108, cement 116 securing casing 120 within the borehole 108, a tubular (not shown) secured in the casing 120 (e.g., production services tubing), and/or a subterranean formation 124 penetrated by the borehole 108.

The toolstring 104 is suspended in the borehole 108 from the lower end of the conveyance means 112. The conveyance means 112 may be a single- or multi-conductor slickline or wireline logging cable spooled on a drum 113 of a winch 115 at the surface 128 of the wellsite from whence the borehole 108 extends. The wellsite surface 128 is the generally planar surface of the terrain (i.e., Earth's surface), a floor of a rig (not shown) at the wellsite, or other equipment at the wellsite, which is perpendicularly penetrated by the borehole 108. Operation of the winch 155 rotates the drum 113 to reel in the conveyance means 112 and thereby pull the toolstring 104 in an uphole direction 101 in the borehole 108, as well as to reel out the conveyance means 112 and thereby move the toolstring 104 in a downhole direction 102 in the borehole 108. The conveyance means 112 may include at least one conductor (not shown) that facilitates data communication between the toolstring 104 and surface equipment 132 disposed at the wellsite surface 128, including through one or more slip rings, cables, and/or other conductors (schematically depicted in FIG. 1 by reference number 133) electrically connecting the one or more conductors of the conveyance means 112 with the surface equipment 132. However, in other embodiments, such conductor(s) may not exist or may otherwise not facilitate data communication, in which case data may be stored downhole until the toolstring 104 is retrieved from the borehole 108.

Although not illustrated as such in FIG. 1, the winch 115 may be disposed on a service vehicle or a stationary skid/platform. The service vehicle or stationary skid/platform may also contain at least a portion of the surface equipment 132.

The toolstring 104 comprises a plurality of modules 136, one or more of which may comprise an elongated housing and/or mandrel carrying various electronic and/or mechanical components. For example, at least one of the modules 136 may be or comprise at least a portion of a device for measuring a feature and/or characteristic of the borehole 108, the casing 120, a tubular installed in the casing 120 (not shown), the cement 116, and/or the formation 124, and/or a device for obtaining sidewall or inline core and/or fluid (liquid and/or gas) samples from the borehole 108 and/or formation 124. Other implementations of the downhole toolstring 104 within the scope of the present disclosure may include additional or fewer components or modules 136 relative to the example implementation depicted in FIG. 1.

The wellsite system 100 may also include a data processing system that may include at least a portion of one or more of the surface equipment 132, control devices and/or other electrical and/or mechanical devices in one or more of the modules 136 of the toolstring 104 (such as a downhole controller 140), a remote computer system (not shown), communication equipment, and/or other equipment. The data processing system may include one or more computer systems or devices and/or may be a distributed computer system. For example, collected data or information may be stored, distributed, communicated to a human wellsite operator, and/or processed locally (downhole or at surface) or remotely.

The data processing system may, individually or in combination with other system components, perform the methods and/or processes described below, or portions thereof. For example, the data processing system may include processor capability for collecting caliper, acoustic, ultrasonic, and/or other data related to the evaluation of the cement 116, the casing 120, a tubular installed in the casing 120 (not shown), and/or the formation 124, according to one or more aspects of the present disclosure. Methods and/or processes within the scope of the present disclosure may be implemented by one or more computer programs that run in a processor located, for example, in one or more modules 136 of the toolstring 104 and/or the surface equipment 132. Such programs may utilize data received from the downhole controller 140 and/or other modules 136 and may transmit control signals to operative elements of the toolstring 104, where such communication may be via one or more electrical or optical conductors of the conveyance means 112. The programs may be stored on a tangible, non-transitory, computer-usable storage medium associated with the one or more processors of the downhole controller 140, other modules 136 of the toolstring 104, and/or the surface equipment 132, or may be stored on an external, tangible, non-transitory, computer-usable storage medium that is electronically coupled to such processor(s). The storage medium may be one or more known or future-developed storage media, such as a magnetic disk, an optically readable disk, flash memory, or a computer-readable device of another kind, including a remote storage device coupled over one or more wired and/or wireless communication links, among other examples.

As designated in FIG. 1 by reference number 138, at least one of the modules 136 may be or comprise a multi-finger measuring or caliper (MFC) tool operable for acquiring measurements of the diameter of the inner wall of the casing 120 (or another tubular, such as production tubing). For example, measuring fingers 139 of the MFC module 138 independently move radially in response to undulations (not shown) of the ID 144 of the casing 120 while the toolstring 104 is conveyed in the downhole and/or uphole direction 101, thereby detecting changes in the ID 144 of the casing 120. For example, the MFC module 138 may transform such radial movement of the tips of the fingers 139 into motion measured by a displacement sensor, such as a linear variable differential transformer (LVDT) sensor. The multiple fingers 139 are distributed around the circumference of the MFC module 138, such that a mapping of a measured section of the casing 120 can be generated by integrating the different measuring points associated with the different fingers 139. In drilling and production environments, among other applications within the scope of the present disclosure, the MFC module 138 may be utilized to evaluate corrosion, erosion, wear, bending, eccentricity, buckling, holes, and other faults in the borehole 108, the casing 120, and/or a tubular (not shown) installed in the casing 120. The MFC module 138 may also be used to measure the accumulation of scale, paraffin, and/or other deposits on the inner wall of the casing 120 or other tubulars.

The number of measuring fingers 139 of the MFC module 138 may vary among implementations within the scope of the present disclosure. For example, the MFC module 138 may comprise 40 fingers, such as in implementations in which an outer diameter (OD) or profile of the MFC module 138 is about 7.0 centimeters (cm). When utilized with suitable adapters, such implementations of the MFC module 138 may be utilized across the range of existing casing sizes and conveyance types utilized in the industry. Offering just a single such design of the MFC module 138 may decrease financial costs, logistics complexity, and related maintenance operations associated with offering more than one tool size. Nonetheless, the MFC module 138 may also be offered in more than one tool size collectively covering the range of existing casings and conveyance types. For example, such tool sizes may include a smaller version with 24 fingers and an OD of about 1.7 centimeters (cm) and/or a larger version with 60 fingers and an OD of about 8.6 cm. However, other implementations within the scope of the present disclosure may include other numbers of fingers and/or other OD sizes.

As designated in FIG. 1 by reference number 146, another one (or more) of the modules 136 may be or comprise a centralizer module. For example, the centralizer module 146 may comprise an electric motor driven by a controller (neither shown) and/or other means for actively extending ("opening") and retracting ("closing") a plurality of centralizing arms 147. Although only two centralizing arms 147 are depicted in the example implementation shown in FIG. 1, other implementations within the scope of the present disclosure may have more than two centralizing arms 147. Extension of the centralizing arms 147 aids in urging the MFC module 138 to a central position within the casing 120, another tubular, or the borehole 108 being investigated by the MFC module 138. Implementations of toolstrings within the scope of the present disclosure may include more than one instance of the MFC module 138, as well as instances of the centralizer module 146 at each end of each MFC module 138. Other toolstring implementations within the scope of the present disclosure may include two or more instances of the MFC module 138 coupled end-to-end between two opposing instances of the centralizer module 146. However, other toolstring implementations are also within the scope of the present disclosure.

Figure 2:
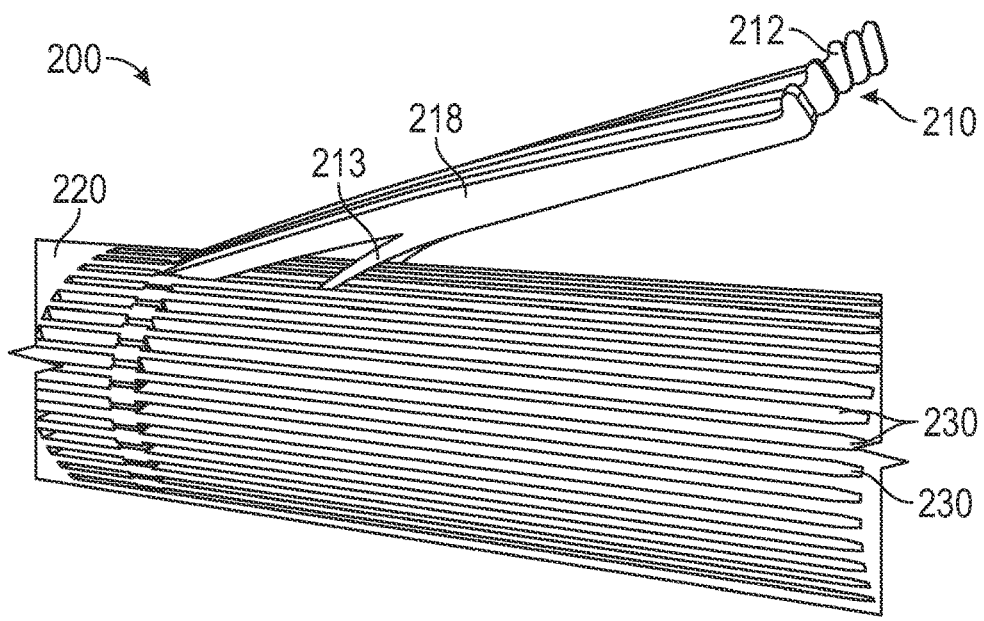
FIG. 2 is a perspective view of a portion of an example implementation of an MFC module according to one or more aspects of the present disclosure.

FIG. 2 is a perspective view of a portion of an MFC module 200 according to one or more aspects of the present disclosure. The MFC module 200 shown in FIG. 2 is an example implementation of the MFC module 138 shown in FIG. 1. For example, the depicted portion of the MFC module 200 in FIG. 2 includes five measuring fingers 210 that are example implementations of the measuring fingers 139 shown in FIG. 1.

The MFC module 200 comprises a tool body 220 comprising a plurality of slots 230. Each measuring finger 210 has a tip 212 that contacts an ID of a tubular (e.g., the ID 144 of the casing 120 in FIG. 1) while the MFC module 200 is operated to sense the tubular ID. That is, each measuring finger 210 is independently rotatable within a corresponding one of the slots 230 in response to undulations of the tubular ID while the MFC module 200 is moved axially within the tubular. Each measuring finger 210 may also comprise a biasing feature 213 configured to aid in maintaining the tip 212 in contact with the tubular ID. For example, the biasing feature 213 may be a cantilevered portion of the body 218 of the measuring finger 210, and the material from which the body 218 (or at least the biasing feature 213) is formed may have sufficient elasticity to urge the tip 212 away from the tool body 220. However, other means for maintaining contact between the tip 212 of the measuring fingers 210 with the tubular ID are also within the scope of the present disclosure.

Figure 3:
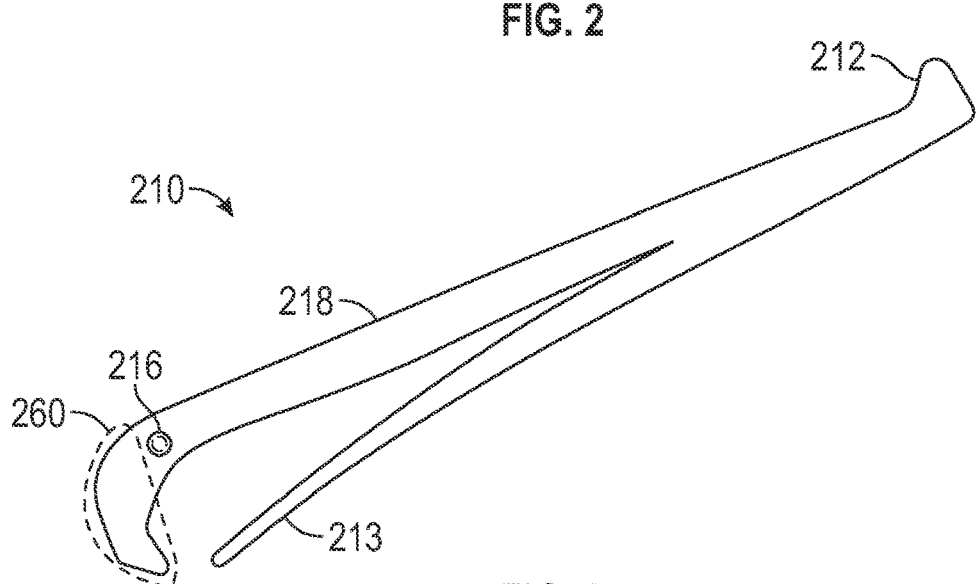
FIG. 3 is a profile view of an example implementation of a measuring finger according to one or more aspects of the present disclosure.
Figure 4:
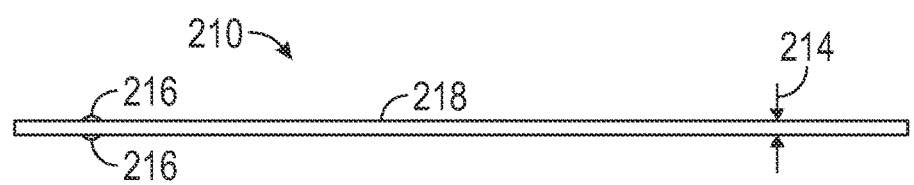
FIG. 4 is a side view of an example implementation of the measuring finger shown in FIG. 3.
Figure 5:
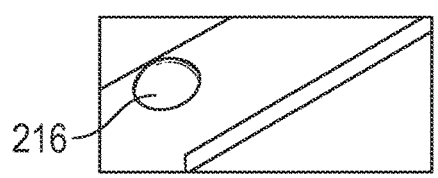
FIG. 5 is a perspective view of a portion of the measuring finger shown in FIG. 4.
Figure 6:
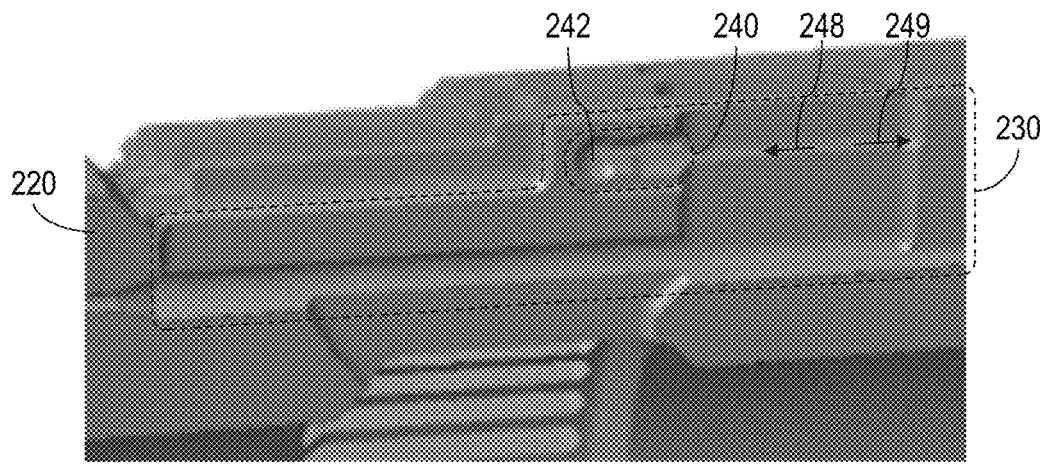
FIG. 6 is a perspective view of a portion of an example implementation the tool body shown in FIG. 2.
Figure 7:
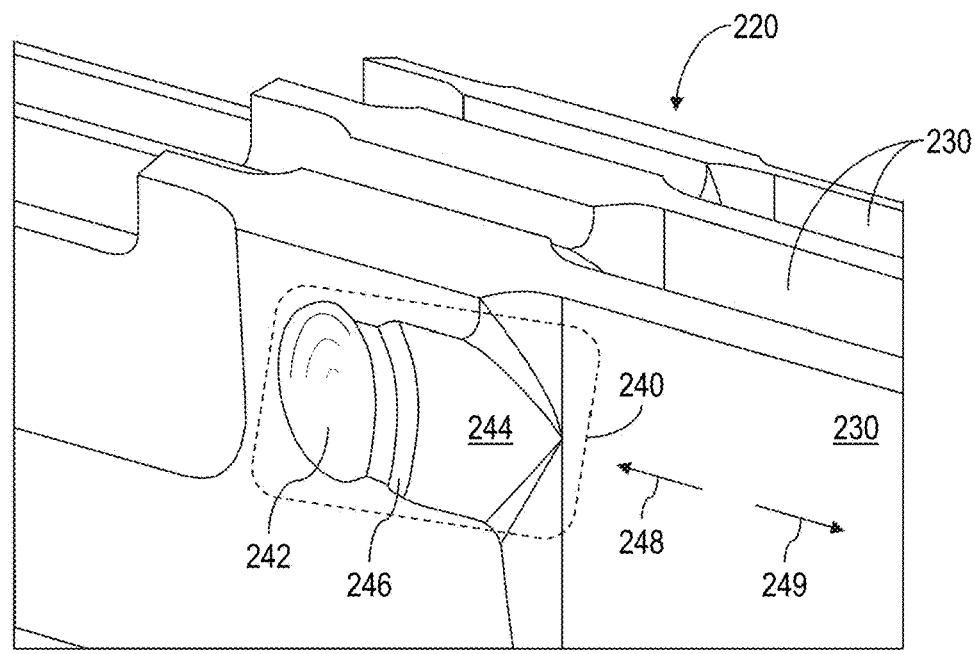
FIG. 7 is another perspective view of a portion of the tool body shown in FIG. 6.
Figure 8:
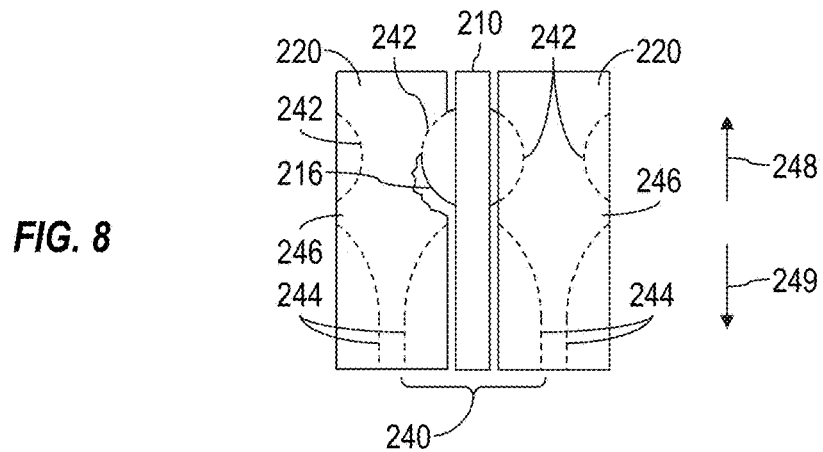
FIG. 8 is a schematic view of a pivot formed by substantially spherical portions of the measuring finger and tool body shown in FIGS. 4-7.

FIG. 3 is an outline view of an example implementation of one of the measuring fingers 210. FIG. 4 is a side view of an example implementation of the measuring finger 210 shown in FIG. 3. FIG. 5 is a perspective view of a portion of the measuring finger 210 shown in FIG. 4. FIG. 6 is a perspective view of a portion of an example implementation of the tool body 220 shown in FIG. 2, depicting a receptacle 240 in one of the slots 230. FIG. 7 is another perspective view of the receptacle 240 shown in FIG. 6. FIG. 8 is a schematic view of two portions of the tool body 220 forming opposing sides of a receptacle 240 on opposing sides of a portion of a measuring finger 210. The following description refers to FIGS. 2-8, collectively.

Each measuring finger 210 is independently rotatable within the corresponding slot 230 via a corresponding pivot formed by complementary, substantially spherical portions of the measuring finger 210 and the receptacle 240 of the corresponding slot 230. For example, each measuring finger 210 may have a uniform thickness 214 (FIG. 4) and may include opposing substantially spherical portions 216 that are convex, thus protruding from opposing sides of the otherwise substantially planar body 218 of the measuring finger 210. In such example, each receptacle 240 includes two opposing, substantially spherical portions 242 that are concave located on the side walls of the receptacle 240.

An example concave portion 242 is shown in FIGS. 6 and 7. FIG. 8 is a schematic view of one of the pivots formed by two opposing concave portions 242 of a receptacle 240 mating with two opposing convex portions 216 of a measuring finger 210. A portion of the left-hand side of the receptacle 240 (relative to the page) is removed so as to reveal the corresponding convex portion 216. Thus, FIG. 8 demonstrates an example implementation of how the convex portions 216 of the measuring finger 210 and the concave portions 242 of the receptacle 240 are complementary, and thereby form a pivot similar to a ball-and-socket joint.

The complementary nature of the convex portions 216 of the measuring finger 210 and the concave portions 242 of the receptacle 240 may be that the mating portions 216, 242 have substantially similar radii, differing by no more than a predetermined percentage, e.g., about ten percent. For example, the convex portions 216 of the measuring finger 210 and the concave portions 242 of the receptacle 240 may have identical radii, such that the convex portions 216 of the measuring finger 210 may be in surface contact with the concave portions 242 of the receptacle 240. However, manufacturing tolerances and/or other factors may result in one or both of the convex portions 216 of each measuring finger 210 being in line contact with the mating concave portions 242 of the corresponding receptacle 240 where the convex portions 216 have larger radii than the mating concave portions 242, or in point contact where the concave portions 242 have larger radii than the mating convex portions 216.

Although not illustrated in the figures, other implementations of the MFC module 200 within the scope of the present disclosure may include at least partial reversal of the convex-concave configurations of the substantially spherical portions 216 of one or more of the measuring fingers 210 and the corresponding substantially spherical portions 242 of the corresponding receptacle(s) 240. That is, one or more (or each) of the measuring fingers 210 may have substantially spherical portions 216 that are concave instead of convex, and the corresponding receptacle(s) 240 may have substantially spherical portions 242 that are convex instead of concave. Moreover, the complementary spherical convex-concave spherical portions may be replaced by other complementary protruding-recessed portions that function as a pivot link, such as pointed or conical portions, among other examples.

For instances in which the substantially spherical portions 216 of the measuring fingers 210 are concave, such concave portions 216 may be integral cavities formed via traditional or future-developed manufacturing techniques, such as CNC (computer numerical control) machining and/or other subtractive manufacturing techniques. However, additive manufacturing techniques may also be utilized, whereby materials are joined to make the measuring fingers 210 from three-dimensional (3D) model data, such as by adding material layer upon layer based on the 3D model data until the concave portion 216 (or the entirety of the measuring finger 210) is completely formed. For instances in which the substantially spherical portions 216 of the measuring fingers 210 are convex, such convex portions 216 may also be integrally formed, but may also be one or more discrete components coupled to the measuring fingers 210. For example, the convex portions 216 of a measuring finger 210 may be formed by opposing sides of the outer surface of a steel (or other inelastic material) sphere (e.g., a bearing ball) embedded in the measuring finger body 218, such as by press/interference fit of the sphere into the measuring finger body 218, or by forming the body 218 of the measuring finger 210 around the sphere, such as by molding, additive manufacturing, and/or other techniques.

The tool body 220 may be formed via traditional or future-developed manufacturing techniques, whether subtractive and/or additive. The receptacles 240 may be integrally formed in the tool body 220 or may be discrete components joined to or otherwise carried by the tool body 220.

During use of the MFC module 200, the measuring fingers 210 slide on the ID of the tubular being measured. The materials of the measuring fingers 210 are selected to be stiff and wear resistant, but perhaps not to the extent that would damage the tubular being measured. Thus, the measuring fingers 210 may be deemed consumables, and the substantially spherical joint described above may permit replacement of one or more of the measuring fingers 210 without invasive maintenance, such that the measuring fingers 210 may be rapidly docked in and un-docked from the tool body 220 at a rig site without the obligatory transportation to and from a remote maintenance site and/or other facility where such reconfiguration of the measuring fingers 210 has conventionally been performed.

For example, the tool body 220, or at least the one or more portions of the tool body 220 that comprise and/or form the receptacles 240, may be formed of a material having sufficient elasticity to permit such docking/undocking. However, the substantially spherical portions of the measuring fingers 210 may instead (or also) provide the elasticity permitting docking/undocking. In either configuration, the elasticity of the convex and/or concave portions of the substantially spherical pivot permits docking (engagement) and undocking (disengagement) of the convex and concave portions via application of a force sufficient to overcome the elasticity. The force may be two times, three times, or otherwise substantially greater than the forces expected to be encountered by the measuring fingers 210 while the MFC module 200 is disposed in the tubular being examined.

FIGS. 6-8 also illustrate ramp portions 244 of the receptacles 240 each separated from a corresponding concave portion 242 via a ridge 246. The ramp portions 244 may aid with alignment and/or other aspects of the installation of the convex portions 216 of each measuring finger 210 into the concave portions 242 of the corresponding receptacle 240. For each measuring finger 210 installed in a corresponding receptacle 240, the ridges 246 of the receptacle 240 retain the engagement of the convex portions 216 of the measuring finger 210 within the concave portions 242 of the receptacle 240. Installing a measuring finger 210 in a receptacle 240 may thus entail applying the docking/engagement force described above (e.g., in a direction 248) sufficient to overcome the elasticity of the receptacle 240 (e.g., of the ridges 246) and/or the convex portions 216 of the measuring finger 210 so that the convex portions 216 snap past the ridges 246 (e.g., in direction 248) and, thus, into engagement with the concave portions 242. Similarly, removing a measuring finger 210 from a receptacle 240 may entail applying the undocking/disengagement force described above (e.g., in a direction 249 opposite to direction 248) sufficient to overcome the elasticity of the receptacle 240 (e.g., of the ridges 246) and/or the convex portions 216 of the measuring finger 210 so that the convex portions 216 snap out of and thereby disengage from the concave portions 242 (e.g., past the ridges 246 in direction 249).

Contrary to the conventional devices, having the pivot link on the lateral walls of the slots (receptacles 240) may permit easy maintenance of the MFC module 200, because there is no need of changing the whole MFC module 200 or to disassemble all or part of the body to remove one finger 210. Changing a finger 210 may be a simple operation easily performed by a non-qualified operator at the well site. Further, having a pivot link based on a pair of protruding/recessed portions considerably reduces the wear of the link, which may permit stable measurements over time. Such configuration also permits a greater freedom of design of the fingers 210, which may permit better transmission of information between the tips 212 of the fingers 210 in contact with the tubular being examined and the corresponding displacement sensor, as further described below.

Figure 9:
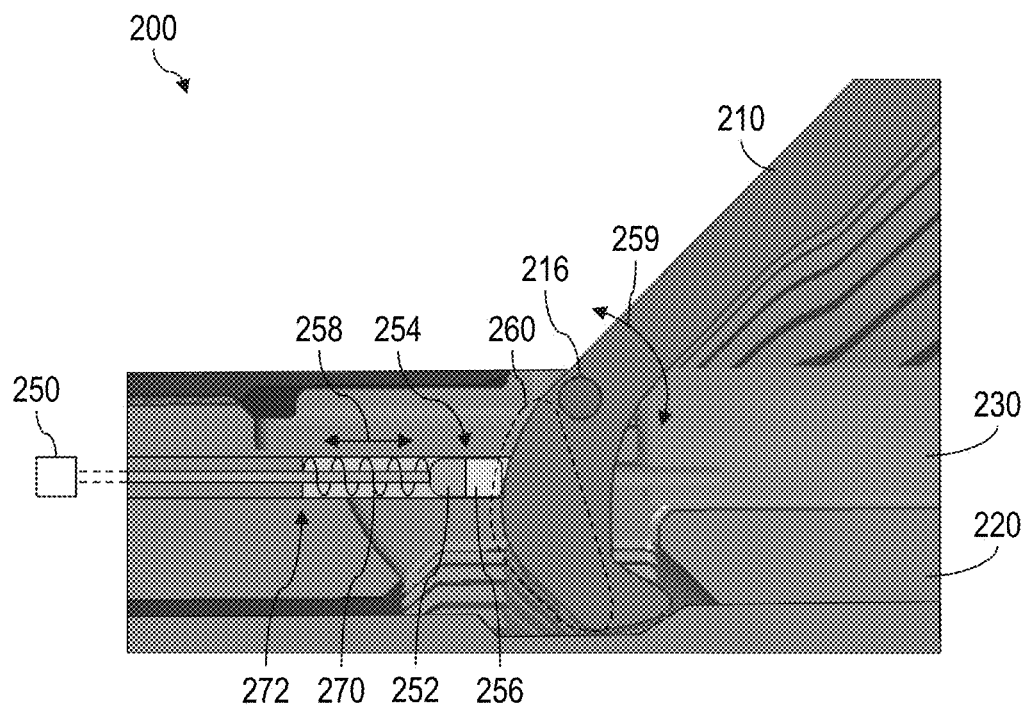
FIG. 9 is a perspective view of a portion of the MFC module shown in FIG. 2.
Figure 10:
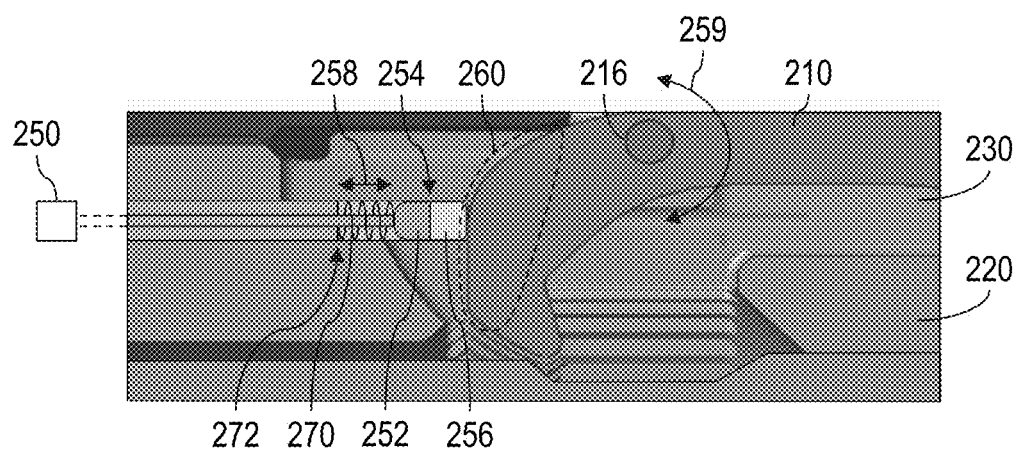
FIG. 10 is another perspective view of the MFC module shown in FIG. 9 with the measuring fingers collapsed.

FIGS. 9 and 10 are perspective views of the MFC module 200 depicting a linear displacement sensor 250 operable for sensing the orientation of one of the measuring fingers 210 relative to the tool body 220. Although not depicted in the figures, the MFC module 200 comprises a plurality of such sensors 250, each operable for sensing the orientation of a corresponding one of the measuring fingers 210 relative to the tool body 220. The sensors 250 are operable for sensing the orientation of the measuring fingers 210 when expanded and contacting the ID of the tubular being examined, as depicted by the orientation shown in FIG. 9, as well as for sensing that the measuring fingers 210 have been fully collapsed into the slots 230 of the tool body 220, as depicted by the orientation shown in FIG. 10.

For each sensor 250 and corresponding measuring finger 210, an actuated portion 252 of the sensor 250 is linearly displaced in response to sliding contact between a feature associated with the actuated portion 252 of the sensor 250 and a cam portion 260 of the measuring finger 210. The feature associated with the actuated portion 252 of the sensor 250 may be the tip 254 of the actuated portion 252. However, as depicted in FIGS. 9 and 10, the feature associated with the actuated portion 252 of the sensor 250 may be an interposing member 256 attached to the tip 254 of the actuated portion 252. The interposing member 256 may be a magnet magnetically attracted to the cam portion 260 and/or other means for maintaining sliding contact with the cam portion 260 as the measuring finger 210 rotates 259 around the pivot partially formed by the substantially spherical portion 216 of the measuring finger 210. The sensor 250 is displaced as the cam portion 260 is configured so that the distance between the convex portions 216 forming the pivot axis and the contacting point of the finger 210 with the sensor 250 (e.g., the interposing member 256 in the example implementation shown in FIGS. 9 and 10) varies with changes of the angle of the finger 210 angle relative to the body 220 (hence, changes of the ID of the casing or other tubular being examined).

Implementations within the scope of the present disclosure may include alternative or additional means for maintaining sliding contact between the feature associated with the actuated portion 252 of the sensor 250 and the cam portion 260 of the measuring finger 210 (i.e., distances between contacting surface with the sensor 250 and the pivot axis at each position of the finger 210). For example, for each sensor 250 and corresponding measuring finger 210, a corresponding spring 270 may bias the feature associated with the actuated portion 252 of the sensor 250 into contact with the cam portion 260. The spring 270 may be confined between the actuated portion 252 of the sensor 250 and a shoulder, cavity, surface, or other feature 272 of the tool body 220.

By maintaining sliding contact between the feature associated with the actuated portion 252 of the sensor 250 and the cam portion 260 of the measuring finger 210, and by design of the shape of the cam portion 260, the linear displacement (e.g., in directions 258) of the actuated portion 252 of each sensor 250 caused by rotation 259 of the corresponding measuring finger 210 may be more accurately utilized in determining the radial position of the tip 212 of that measuring finger 210, at least relative to conventional MFC tools. For example, the linear displacement 258 of the actuated portion 252 of each sensor 250 may be linearly related to the radial position of the tip 212 of the corresponding measuring finger 210, excepting manufacturing tolerances (i.e., quasi-linearly), whereas conventional MFC tools often rely on a polynomial, noncontinuous relationship between the sensor displacement and the tip of the corresponding measuring finger. Consequently, the ID of the tubular being examined may be more accurately mapped, and calibration of the MFC module 200 may also be more robust, less complicated, and both procedurally and computationally less extensive.

Figure 11:
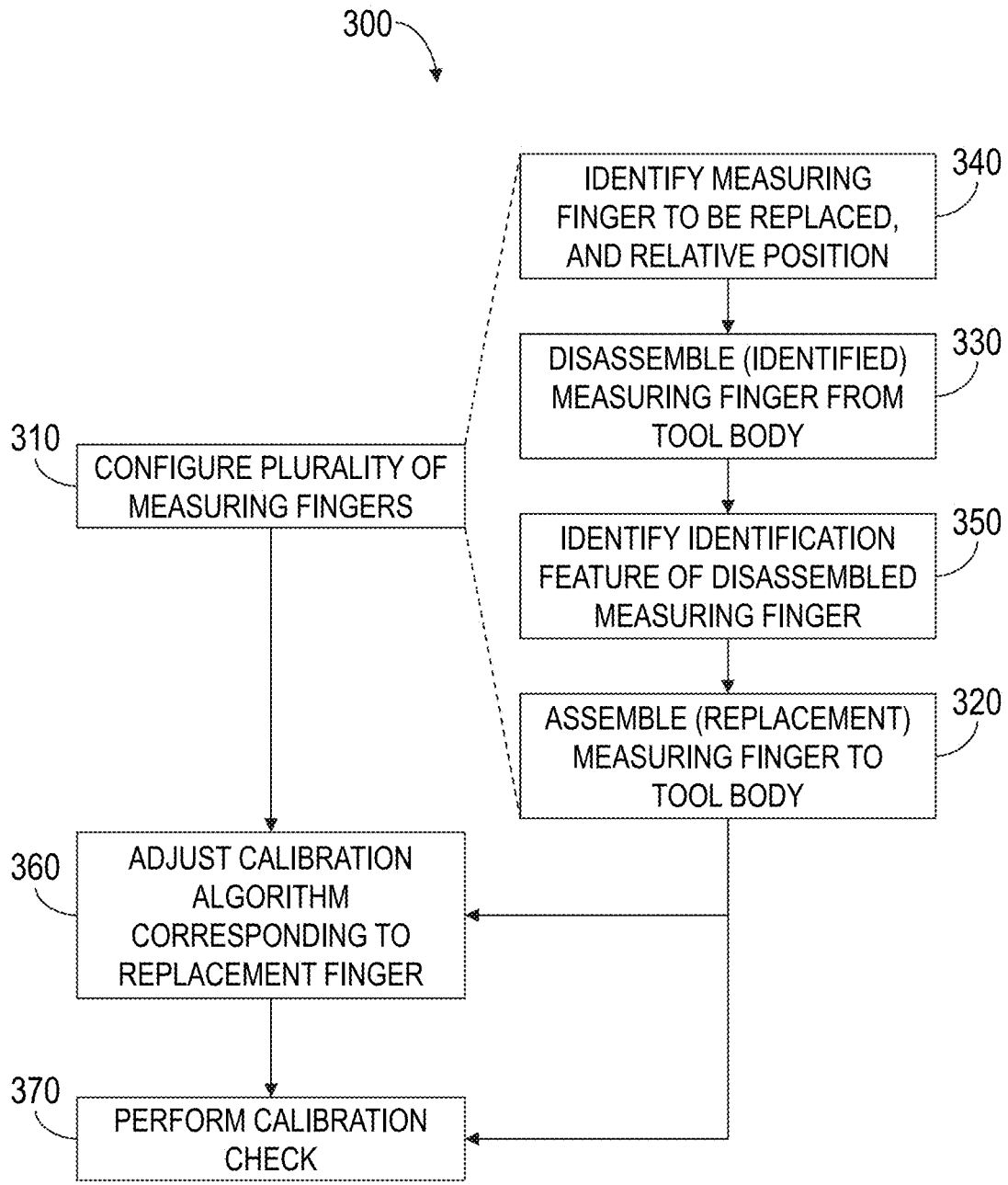
FIG. 11 is a flow-chart diagram of at least a portion of an example implementation of a method of configuring an MFC module according to one or more aspects of the present disclosure.

FIG. 11 is a flow-chart diagram of at least a portion of an example implementation of a method 300 according to one or more aspects of the present disclosure. The method 300 comprises configuring 310 a plurality of measuring fingers in a tool body of an MFC module, such as the MFC module 200 described above and/or or other implementations within the scope of the present disclosure. Accordingly, the following description refers to FIGS. 1-11, collectively.

Configuring 310 the plurality of measuring fingers 210 may comprise assembling 320 an unassembled measuring finger 210 to the tool body 220 by applying the above-described docking/engagement force to the unassembled measuring finger 210 to cause engagement of the convex and concave portions 216/242 of the unassembled measuring finger 210 and a corresponding receptacle 240. However, configuring 310 the plurality of measuring fingers 210 may instead comprise disassembling 330 an assembled measuring finger 210 from the tool body 220 by applying the above-described undocking/disengagement force to the assembled measuring finger 210 to cause disengagement of the convex and concave portions 216/242 of the assembled measuring finger 210 and the corresponding receptacle 240.

Configuring 310 the plurality of measuring fingers 210 may also comprise both disassembling 330 an assembled measuring finger 210 from the tool body 220 and assembling 320 an unassembled (e.g., replacement) measuring finger 210 to the tool body 220. For example, configuring 310 the plurality of measuring fingers 210 may comprise identifying 340 an assembled one of the measuring fingers 210 to be replaced and a relative position of the identified 340 measuring finger 210 in the MFC module 200, disassembling 330 the identified 340 measuring finger 210 from the tool body 220 by applying the above-described undocking/disengagement force to the identified 340 measuring finger 210 to cause disengagement of the convex and concave portions 216/242 of the identified 340 measuring finger 210 and the corresponding receptacle 240, and identifying 350 a serial number and/or other identification feature of the disassembled 330 measuring finger 210. A replacement measuring finger 210 may then be assembled 320 into the tool body 220 in the identified 340 relative position (vacated the disassembled 330 measuring finger 210) by applying the above-described docking/engagement force to the replacement measuring finger 210 to cause engagement of the convex and concave portions 216/242 of the replacement measuring finger 210 and the corresponding receptacle 240. As described above, such configuring 310 may be performed at the rig site, instead of transporting the MFC module 200 to an offsite maintenance site or other facility.

Configuring 310 the plurality of measuring fingers 210 may further comprise adjusting 360 a calibration algorithm of the MFC module 200 based on dimensional parameters (e.g., variations of the dimensions of the fingers 210 may exist due to manufacturing tolerances) of the assembled 320 replacement measuring finger(s) 210. For example, the measured dimensions, materials, and/or other parameters of the assembled 320 replacement measuring finger(s) 210 may be used to replace the same parameters of the measuring finger(s) 210 disassembled from the relative position(s) now occupied by the replacement measuring finger(s) 210. Configuring 310 the plurality of measuring fingers 210 may also or instead comprise performing 370 a calibration check of the MFC module 200 after one or more replacement measuring fingers 210 are installed 320. For example, the calibration check may be performed 370 by operating the MFC module 200 at two portions of the examined tubular (or another tubular), wherein the two portions have different ID values. However, other or additional calibration checks are also within the scope of the present disclosure.

In view of the entirety of the present disclosure, including the figures and the claims, a person having ordinary skill in the art will readily recognize that the present disclosure introduces an apparatus comprising an MFC module for use in a tubular extending into a subterranean formation, wherein the MFC module comprises: a tool body comprising a plurality of slots each comprising a receptacle; a plurality of measuring fingers, wherein each measuring finger is independently rotatable within a corresponding one of the slots via a corresponding pivot formed by complementary linking portions of the measuring finger and the receptacle of the corresponding slot, and wherein the linking portions of the receptacle are situated on opposing side walls of the receptacle; and a plurality of linear displacement sensors each operable for sensing an orientation of a corresponding one of the measuring fingers relative to the tool body.

For each measuring finger and corresponding slot: a first one of the linking portions of the measuring finger and the receptacle may be a protruding portion; a second one of the linking portions of the measuring finger and the receptacle may be a recessed portion; and an elasticity of at least one of the protruding and recessed portions may permit disengagement of the protruding and recessed portions via application of a force sufficient to overcome the elasticity. The force may be substantially greater than any other force expected to be encountered by the measuring fingers while the MFC module is disposed in the tubular.

For each measuring finger and corresponding slot: the linking portion of the measuring finger may be protruding; the linking portion of the receptacle may be recessed; and an elasticity of the receptacle may permit disengagement of the linking portions of the measuring finger and the receptacle via application of a force sufficient to overcome the elasticity. An elasticity of the linking portion of the measuring finger may be substantially less than the elasticity of the linking portion of the receptacle. The linking portion of the measuring finger may be substantially inelastic. The linking portion of the measuring finger may be made of steel. At least a portion of the tool body comprising the receptacle of each slot may be formed via additive manufacturing.

The linking portions may be substantially spherical portions. The linking portion of the measurement finger may be a steel sphere. Except for the steel sphere, the measuring finger may have a uniform thickness, and the steel sphere may have a diameter that is greater than the uniform thickness.

Each measuring finger may be independently rotatable in response to undulations of an ID of the tubular while the MFC module is moved axially within the tubular. For each sensor and corresponding measuring finger, an actuated portion of the sensor may be linearly displaced in response to sliding contact between: a feature associated with the actuated portion of the sensor; and a cam portion of the measuring finger. The feature associated with the actuated portion of the sensor may comprise a magnet attached to the actuated portion and magnetically attracted to the cam portion. For each sensor and corresponding measuring finger, a corresponding spring may bias the feature associated with the actuated portion of the sensor into contact with the cam portion. A first end of each measuring finger may be formed by the cam portion, a second end of each measuring finger may be a tip that contacts the ID of the tubular during operation of the MFC module, and the cam portion may have a shape configured so that the linear displacement of the actuated portion of each sensor is quasi-linearly related to a radial position of the tip of the corresponding measuring finger.

The present disclosure also introduces an apparatus comprising an MFC module for use in a tubular extending into a subterranean formation, wherein the MFC module comprises: a tool body comprising a plurality of slots each comprising a receptacle; a plurality of measuring fingers each independently rotatable within a corresponding one of the slots in response to undulations of the inner diameter of the tubular while the MFC module is moved axially within the tubular, wherein each measuring finger is independently rotatable within the corresponding slot via a corresponding pivot formed by complementary linking portions of the measuring finger and the receptacle of the corresponding slot, and wherein the linking portions of each receptacle are situated on opposing side walls of the receptacle; and a plurality of sensors each operable for sensing an orientation of a corresponding one of the measuring fingers relative to the tool body. For each sensor and corresponding measuring finger, an actuated portion of the sensor is linearly displaced in response to sliding contact between: a feature associated with the actuated portion of the sensor; and a cam portion of the measuring finger. For each sensor and corresponding measuring finger, a corresponding spring biases the feature associated with the actuated portion of the sensor into contact with the cam portion.

The feature associated with the actuated portion of the sensor may comprise a magnet attached to the actuated portion and magnetically attracted to the cam portion.

A first end of each measuring finger may be formed by the cam portion; a second end of each measuring finger may be a tip that contacts the inner diameter of the tubular during operation of the MFC module; and the cam portion may have a shape configured so that the linear displacement of the actuated portion of each sensor is quasi-linearly related to a radial position of the tip of the corresponding measuring finger.

The present disclosure also introduces a method comprising configuring a plurality of measuring fingers in a tool body of an MFC module for use in a tubular extending into a subterranean formation, wherein: (A) the tool body comprises a plurality of slots each comprising a receptacle; (B) when assembled in the tool body, each measuring finger is independently rotatable within a corresponding one of the slots via a corresponding pivot formed by complementary linking portions of the measuring finger and the receptacle of the corresponding slot; (C) for each measuring finger and corresponding slot: (i) a first one of the linking portions of the measuring finger and the receptacle is a protruding portion; (ii) a second one of the linking portions of the measuring finger and the receptacle is a recessed portion; and (iii) an elasticity of at least one of the protruding and recessed portions permits engagement and disengagement of the protruding and recessed portions via application of a force sufficient to overcome the elasticity; and (D) configuring the plurality of measuring fingers comprises at least one of: (i) assembling an unassembled measuring finger into the tool body via application of the force to the unassembled measuring finger to cause engagement of the protruding and recessed portions of the unassembled measuring finger and a corresponding receptacle; and (ii) disassembling an assembled measuring finger from the tool body via application of the force to the assembled measuring finger to cause disengagement of the protruding and recessed portions of the assembled measuring finger and a corresponding receptacle.

The force may be substantially greater than any other force expected to be encountered by the measuring fingers while the MFC module is disposed in the tubular.

Configuring the plurality of measuring fingers may comprise: identifying an assembled one of the measuring fingers to be replaced and a relative position of the identified measuring finger in the MFC module; disassembling the identified measuring finger from the tool body via application of the force to the assembled measuring finger to cause disengagement of the convex and concave portions of the identified measuring finger and the corresponding receptacle; and assembling a replacement measuring finger into the tool body in the relative position of the disassembled measuring finger via application of the force to the replacement measuring finger to cause engagement of the protruding and recessed portions of the replacement measuring finger and the corresponding receptacle. Configuring the plurality of measuring fingers may further comprise adjusting a calibration algorithm of the MFC module based on dimensional parameters of the assembled replacement measuring finger. Configuring the plurality of measuring fingers may further comprise performing a calibration check of the MFC module by operating the MFC module at two portions of the tubular having different ID values.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. An apparatus comprising:
a multi-finger caliper (MFC) module for use in a tubular extending into a subterranean formation, wherein the MFC module comprises:
a tool body comprising a plurality of slots each comprising a receptacle;
a plurality of measuring fingers, wherein each measuring finger is independently rotatable within a corresponding one of the slots via a corresponding pivot formed by complementary linking portions of the measuring finger and the receptacle of the corresponding slot, and wherein the linking portions of the receptacle are situated on opposing side walls of the receptacle; and
a plurality of linear displacement sensors each operable for sensing an orientation of a corresponding one of the measuring fingers relative to the tool body.

2. The apparatus of claim 1 wherein, for each measuring finger and corresponding slot:
a first one of the linking portions of the measuring finger and the receptacle is a protruding portion;
a second one of the linking portions of the measuring finger and the receptacle is a recessed portion; and
an elasticity of at least one of the protruding and recessed portions permits disengagement of the protruding and recessed portions via application of a force sufficient to overcome the elasticity.

3. The apparatus of claim 2 wherein the force is substantially greater than any other force expected to be encountered by the measuring fingers while the MFC module is disposed in the tubular.

4. The apparatus of claim 1 wherein, for each measuring finger and corresponding slot:
the linking portion of the measuring finger is protruding;
the linking portion of the receptacle is recessed; and
an elasticity of the receptacle permits disengagement of the linking portions of the measuring finger and the receptacle via application of a force sufficient to overcome the elasticity.

5. The apparatus of claim 4 wherein an elasticity of the linking portion of the measuring finger is substantially less than the elasticity of the linking portion of the receptacle.

6. The apparatus of claim 4 wherein the linking portion of the measuring finger is substantially inelastic.

7. The apparatus of claim 4 wherein the linking portion of the measuring finger is made of steel.

8. The apparatus of claim 4 wherein at least a portion of the tool body comprising the receptacle of each slot is formed via additive manufacturing.

9. The apparatus of claim 1 wherein the linking portions are substantially spherical portions.

10. The apparatus of claim 9 wherein:
the linking portion of the measurement finger is a steel sphere;
except for the steel sphere, the measuring finger has a uniform thickness; and
the steel sphere has a diameter that is greater than the uniform thickness.

11. The apparatus of claim 1 wherein:
each measuring finger is independently rotatable in response to undulations of an inner diameter of the tubular while the MFC module is moved axially within the tubular; and
for each sensor and corresponding measuring finger, an actuated portion of the sensor is linearly displaced in response to sliding contact between:
a feature associated with the actuated portion of the sensor; and
a cam portion of the measuring finger.

12. The apparatus of claim 11 wherein the feature associated with the actuated portion of the sensor comprises a magnet attached to the actuated portion and magnetically attracted to the cam portion.

13. The apparatus of claim 11 wherein, for each sensor and corresponding measuring finger, a corresponding spring biases the feature associated with the actuated portion of the sensor into contact with the cam portion.

14. The apparatus of claim 11 wherein:
a first end of each measuring finger is formed by the cam portion;
a second end of each measuring finger is a tip that contacts the inner diameter of the tubular during operation of the MFC module; and
the cam portion has a shape configured so that the linear displacement of the actuated portion of each sensor is quasi-linearly related to a radial position of the tip of the corresponding measuring finger.

15. A method comprising:
configuring a plurality of measuring fingers in a tool body of a multi-finger caliper (MFC) module for use in a tubular extending into a subterranean formation, wherein:
the tool body comprises a plurality of slots each comprising a receptacle;
when assembled in the tool body, each measuring finger is independently rotatable within a corresponding one of the slots via a corresponding pivot formed by complementary linking portions of the measuring finger and the receptacle of the corresponding slot;
for each measuring finger and corresponding slot:
a first one of the linking portions of the measuring finger and the receptacle is a protruding portion;
a second one of the linking portions of the measuring finger and the receptacle is a recessed portion; and
an elasticity of at least one of the protruding and recessed portions permits engagement and disengagement of the protruding and recessed portions via application of a force sufficient to overcome the elasticity; and configuring the plurality of measuring fingers comprises at least one of:

assembling an unassembled measuring finger into the tool body via application of the force to the unassembled measuring finger to cause engagement of the protruding and recessed portions of the unassembled measuring finger and a corresponding receptacle; and disassembling an assembled measuring finger from the tool body via application of the force to the assembled measuring finger to cause disengagement of the protruding and recessed portions of the assembled measuring finger and a corresponding receptacle.

16. The method of claim 15 wherein the force is substantially greater than any other force expected to be encountered by the measuring fingers while the MFC module is disposed in the tubular.

17. The method of claim 15 wherein configuring the plurality of measuring fingers comprises:

identifying an assembled one of the measuring fingers to be replaced and a relative position of the identified measuring finger in the MFC module;

disassembling the identified measuring finger from the tool body via application of the force to the assembled measuring finger to cause disengagement of the protruding and recessed portions of the identified measuring finger and the corresponding receptacle; and assembling a replacement measuring finger into the tool body in the relative position of the disassembled measuring finger via application of the force to the replacement measuring finger to cause engagement of the protruding and recessed portions of the replacement measuring finger and the corresponding receptacle.

18. The method of claim 17 wherein configuring the plurality of measuring fingers further comprises adjusting a calibration algorithm of the MFC module based on dimensional parameters of the assembled replacement measuring finger.

19. The method of claim 18 wherein configuring the plurality of measuring fingers further comprises performing a calibration check of the MFC module by operating the MFC module at two portions of the tubular having different inner diameter values.

* * * * *